United States Patent [19]

Maehara

[11] Patent Number: 5,146,351
[45] Date of Patent: Sep. 8, 1992

[54] IMAGE READER

[75] Inventor: Yoshiaki Maehara, Fukuoka, Japan

[73] Assignee: Matsushita Electric Industrial Co., Ltd., Kadoma, Japan

[21] Appl. No.: 750,736

[22] Filed: Aug. 21, 1991

Related U.S. Application Data

[63] Continuation of Ser. No. 593,326, Oct. 2, 1990, abandoned, which is a continuation of Ser. No. 396,079, Aug. 21, 1989, abandoned.

[30] Foreign Application Priority Data

Aug. 22, 1988 [JP] Japan ................. 63-207650

[51] Int. Cl.$^5$ ............................. H04N 1/40
[52] U.S. Cl. ...................... 358/448; 358/461
[58] Field of Search ............... 358/406, 446, 447, 452, 358/456, 462, 467, 471, 473, 474, 475, 483, 455, 458, 461, 463, 465, 448; 382/50, 53, 54

[56] References Cited

U.S. PATENT DOCUMENTS

| | | | |
|---|---|---|---|
| 3,874,799 | 4/1975 | Isaacs et al. | 356/236 |
| 4,040,094 | 8/1977 | Everett et al. | 358/459 |
| 4,174,528 | 11/1979 | White | 358/213.19 |
| 4,660,082 | 4/1987 | Tomohisa et al. | 358/406 |
| 4,916,549 | 4/1990 | Sekizawa | 358/461 |

Primary Examiner—Edward L. Coles, Sr.
Assistant Examiner—Jerome Grant, II
Attorney, Agent, or Firm—Cushman, Darby & Cushman

[57] ABSTRACT

An image signals of a black reference plate, a white reference plate and a manuscript detected by an image sensor are converted into digital data by an A/D converter, and in the A/D conversion, the image signal of the black reference plate which is enhanced in level is applied to the A/D converter, and then the enhanced digital data for the black reference plate is returned to an original level, and a corrected image data which is represented by a difference of the image data of the manuscript and the image data of the black reference plate is issued.

4 Claims, 10 Drawing Sheets

FIG.10 (a) (Prior Art)
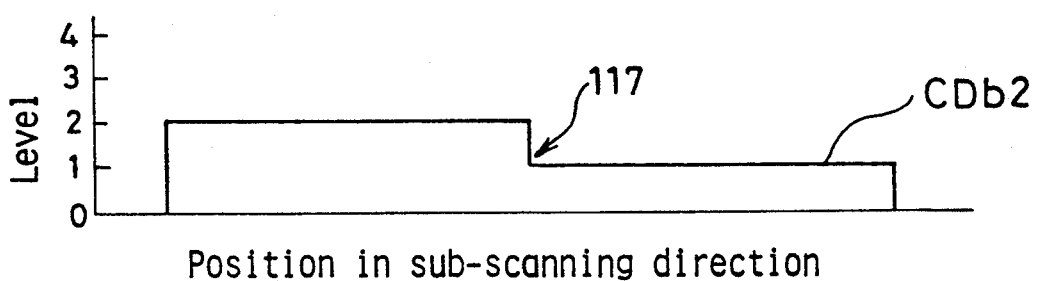
FIG.10 (b) (Prior Art)
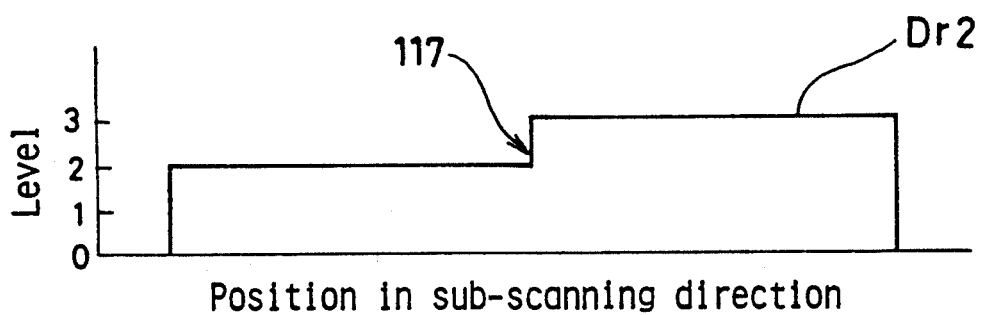

IMAGE READER

This is a continuation of application Ser. No. 07/593,326, filed on Oct. 2, 1990, which was abandoned upon the filing hereof which is a continuation of Ser. No. 07/396,079 filed Aug. 21, 1989 which is now abandoned.

FIELD OF THE INVENTION AND RELATED ART STATEMENT

1. Field of the Invention

The present invention relates generally to an image reader, and more particularly to an image reader for reading a multi-gradation image in a facsimile or digital copying apparatus.

2. Description of the Related Art

Recently, an image reader for reading a multigradation image has been applied to a digital copying apparatus, for example, in which the multi-gradation image on a copying object or manuscript such as a photograph, is converted into digital data, and a halftone of the manuscript is reproduced on a copy paper.

A prior art high-fidelity reading of the multi-gradation image is disclosed in the Japanese published unexamined patent application Sho 61-261295, for example. In the prior art, inequality in the light distribution characteristic of a light source or in the sensitivities of respective elements of an image sensor is compensated on the basis of white reference data of a whitest object and black reference data of a blackest object. Thus a signal to noise ratio in detected image data is improved, and a dynamic range corresponding to the gradation of the manuscript is realized.

FIG. 7 shows a schematic configuration of the image reader in the prior art. Referring to FIG. 7, a manuscript 1, a white reference plate 6 and a black reference plate 7 are fixed on a paper holder 1A. A carriage 5, in which a light source 2, a lens 3 and an image sensor 4 are mounted, is suspended under the paper holder 1A and is moved in the direction of arrow A. The manuscript 1A, the white reference plate 6 and the black reference plate 7 are illuminated by the light source 2, and the images thereof are detected by the image sensor 4 of a self-scanning type through the lens 3. The image sensor 4 is composed of a plurality of semiconductor charge coupled devices (CCD) which are arranged on one line, for example, and is mounted along the perpendicular direction of the paper surface in FIG. 7 (hereinafter referred to as sub-scanning direction). The white reference plate 6 has a reflection coefficient in the neighborhood of 1, and the black reference plate 7 has a reflection coefficient in the neighborhood of zero.

FIG. 8 is a circuit block diagram of the image reader in the prior art. Referring to FIG. 8, a driving circuit 101 supplies a scanning start signal HSYNC and a scanning clock signal VCLK to the image sensor 4. An image signal output from the image sensor 4 is applied to an A/D converter 102 of 8 bits for example, and is converted into digital data. The digital data from the A/D converter 102 is switched by a data selector 103. The data selector 103 is activated by a white shading signal WHT which is generated by a position detecting means of the white reference plate 6 and a black shading signal BLK which is generated by a position detecting means of the black reference plate 7.

A white reference data RAM 104 memorizes white reference data which is image data of the white reference plate 6, and a black reference data RAM 105 memorizes the black reference data which is image data of the black reference plate 7. An address counter 106 issues a signal for indicating write or read address to the white reference data RAM 104 and the black reference data RAM 105. A first subtracter 107 subtracts the black reference data from the white reference data, and a result is applied to a calculator 109.

A second subtracter 108 subtracts the black reference data from the image data of the manuscript 1, and a result is also applied to the calculator 109. The calculator 109 calculates a corrected image data of the manuscript 1 on the basis of the output data of the first and second subtracters.

Operation of the image reader in the prior art is elucidated hereafter.

The semiconductor CCD of the image sensor 4 is scanned in sub-scanning direction of the manuscript 1 which is perpendicular to the paper surface in FIG. 7.

First, the carriage 5 is positioned under the white reference plate 6, and the image sensor 4 detects the white reference plate 6, and the image signal thereof is output in synchronism with the scanning start signal HSYNC and the scanning clock signal VCLK. The detected image signal is converted into digitized image data by the A/D converter 102. The output of the A/D converter 102 is applied to the data selector 103. Then, when a white shading signal WHT for controlling the data selector 103 is output, the data selector 103 is switched to a position 103A, and the image data from the A/D converter 102 is memorized in the white reference data memory RAM 104. In the foregoing process, white reference data Dw of one line of the image sensor 4 is memorized in compliance with the output of the address counter 106. The memorized white reference data Dw represents the maximum level of the image data.

Subsequently, the carriage 5 is moved under the black reference board 7, and the black shading signal BLK is output. Hence, the data selector 103 is switched to a position 103B, and in a similar manner, a black reference data Db of one line of the black reference plate 7 is memorized in the black reference data RAM 105. The black reference data Db represents a black level of the image data and is the minimum level of the image data.

Then, the carriage 5 is moved under of the manuscript 1, and reading process of the manuscript 1 is carried out. Since the white shading signal WHT and the black shading signal BLK are not output, the data selector 103 is switched to a position 103C. The image data Df of one line of the manuscript 1 is inputted to the second subtracter 108 through the data selector 103, and the black reference data Db is subtracted from the image data Df of the manuscript 1: (Df−Db). On the other hand, in the first subtracter 107, the black reference data Db is subtracted from the white reference data Dw: (Dw−Db).

These differences of data (Df−Db) and (Dw−Db) are applied to the calculator 109, and the calculation shown in equation (1) is accomplished. Consequently, a corrected image data Dr is output from the calculator 109.

$$Dr = 255 \times (Df - Db)/(Dw - Db) \tag{1}$$

In the equation (1), the number 255 represents the number of steps in A/D converting of 8 bits.

The image of the manuscript 1 is reproduced on a copy paper on the basis of the corrected image data Dr.

In the above-mentioned prior art, a quantization error or a rounding error can not be disregarded in A/D conversion of the image signal of the black reference plate 7, because the level of the image signal Cf of the black reference plate 7 is relatively lower as shown in FIG. 9(a) and corresponds to lower several steps in 8-bits digital conversion, for example steps 1-3 as shown in FIG. 9(b).

Referring to FIG. 9(a), the ordinate designates an analogue level of the image signal corresponding to the 255 steps in 8-bit digital conversion, and the abscissa designates a position of the image sensor 4 along the sub-scanning direction. A curve Cb represents the image signal of the black reference plate 7, and a curve Cf represents an image signal of the darkest image on the manuscript 1. The convex variations of the levels of both the image signals of the black reference plate 7 and the manuscript 1 are attributed to inequality in the light distribution characteristic of the light source 2.

Referring to FIG. 9(b), a curve CDf represents the image data Df which is the darkest image of the manuscript 1 with respect to a position of the manuscript 1 along the sub-scanning direction, and a curve CDb represents the black reference image data Db, with respect to a position of the black reference plate 7 along the sub-scanning direction. Referring to the equation (1), since the white reference data Dw is greatly larger than the black reference data Db, the denominator (Dw−Db) of the equation (1) is close to the white reference data Dw (e.g. Dw≈250, Db≈2). Therefore, the corrected image data Dr is allowed to be represented by only the numerator (Df−Db).

The corrected image data Dr which is represented by a difference between the curves CDf and CDb in FIG. 9(b) is shown in FIG. 9(c). Referring to FIG. 9(c), the corrected image data Dr varies between steps 2-4, and hence, gradation of the reproduced image of the manuscript 1 is distorted. Summarizing the above, the distortion of gradation of the reproduced image is attributed to the quantization error in A/D conversion of the image data Df and the black reference data Db, and thereby, line-shaped images are reproduced on a copy paper due to the variation of the corrected image data Dr. Thus, the quality of the reproduced image is diminished, since the distortion of gradation in the dark image on a manuscript 1 is rather conspicuous than in whitish image.

OBJECT AND SUMMARY OF THE INVENTION

An object of the present invention is to provide an image reader improved in distortion of gradation in a reproduced dark image in particular.

The image reader in accordance with the present invention comprises:
  a black reference plate having a reflection coefficient in the neighborhood of zero and a manuscript arranged on a common plane,
  an image sensor for issuing image signals of multi-gradation images of the black reference plate or the manuscript,
  an A/D converter for converting the image signals detected by the image sensor into digital data,
  means for enhancing the value of the digital data of the black reference plate with respect to the value of the digital data of the manuscript in A/D conversion,
  a dividing means for returning the enhanced value of the digital data of the black reference plate to the original value,
  a subtracter for subtracting the digital data of the black reference plate from the digital data of the manuscript, and issuing digital data of a difference therebetween, and
  a calculator for converting the digital data of the difference into digital data of the same bits of the A/D converter.

BRIEF DESCRIPTION OF THE DRAWINGS

FIGS. 10(a) and 10(b) are graphs showing an example of operation of the image reader in the prior art.

DESCRIPTION OF THE PREFERRED EMBODIMENTS

Figure 7:
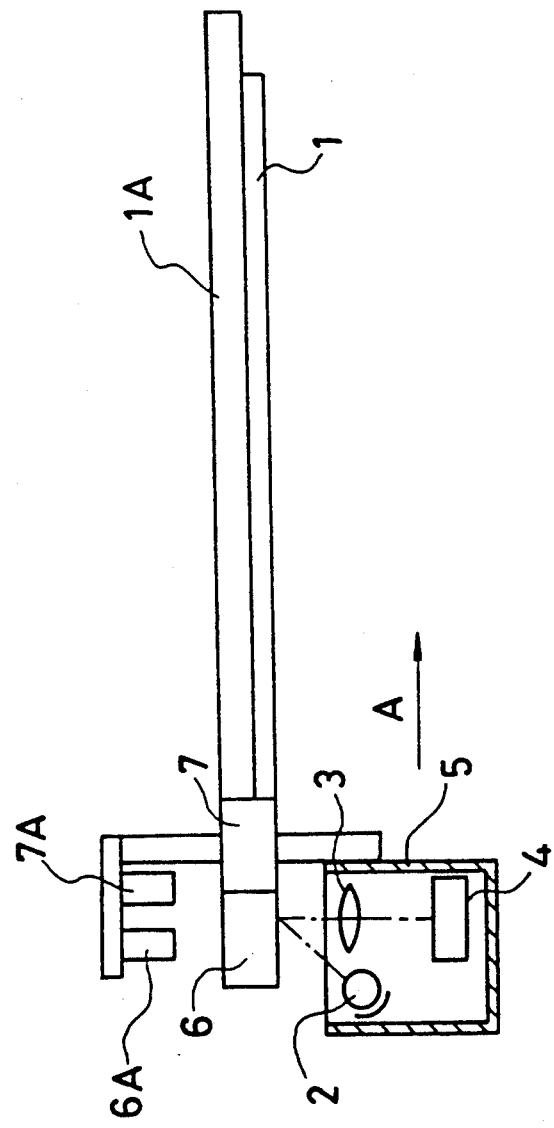
FIG. 7 is the side view of the mechanical configuration of the image reader which is used in common in the present invention and the prior art.
Figure 8:
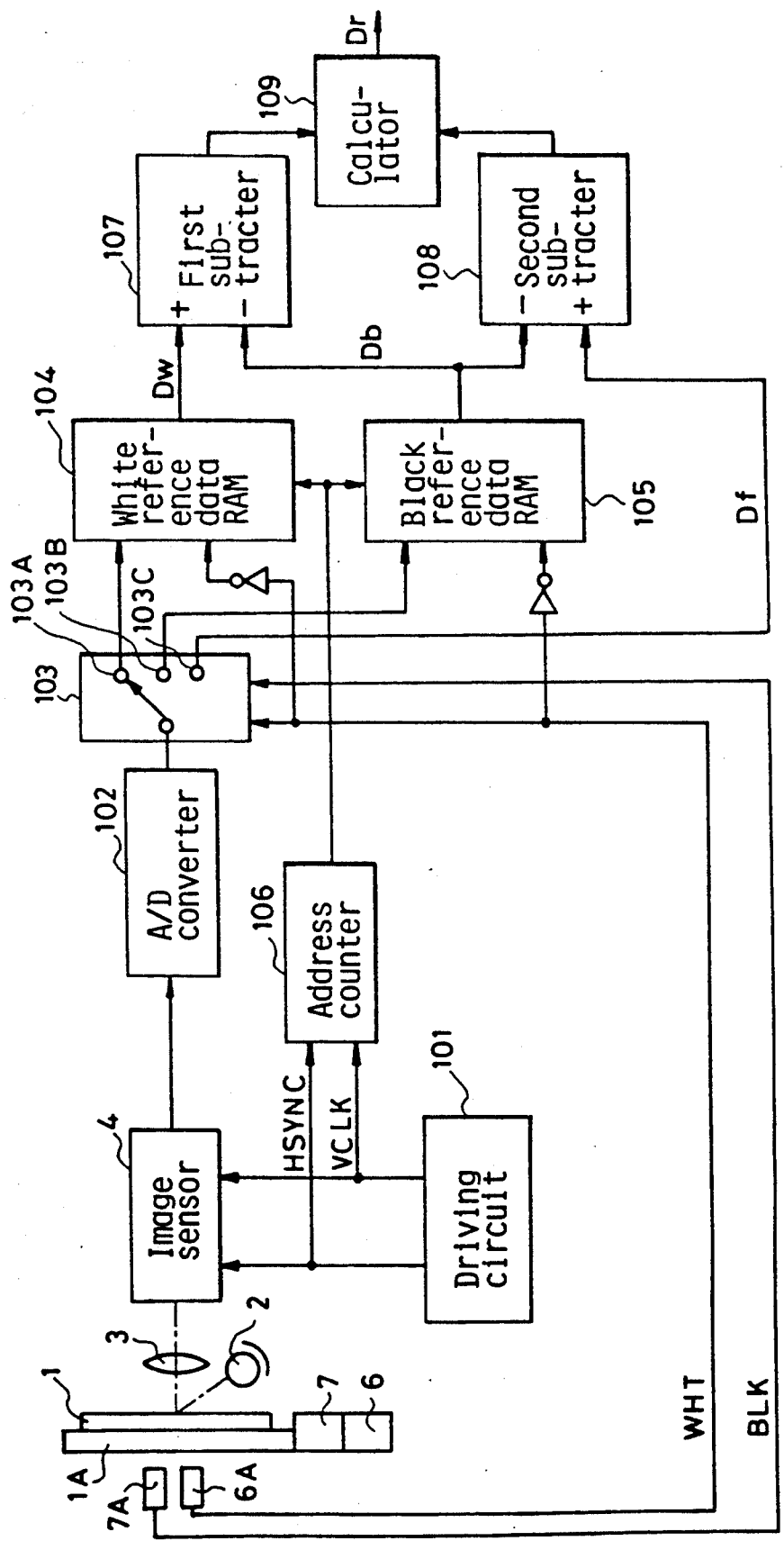
FIG. 8 is the circuit block diagram of the image reader in the prior art.
Figure 9A:
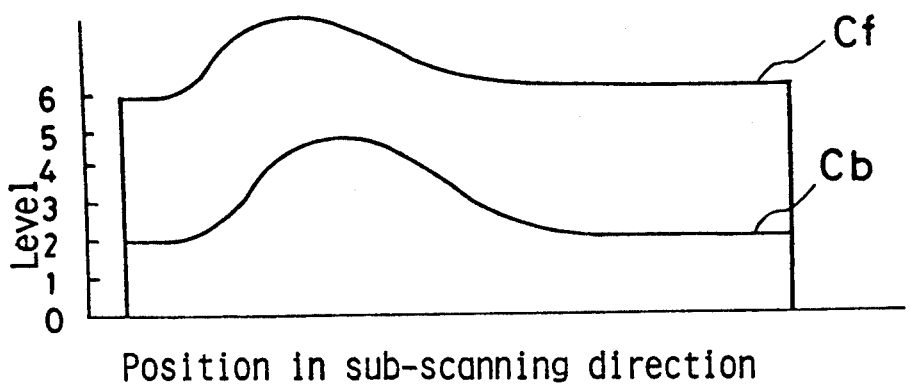
FIGS. 9(a), 9(b) and 9(c) are the graphs showing operation of the image reader in the prior art.
Figure 9B:
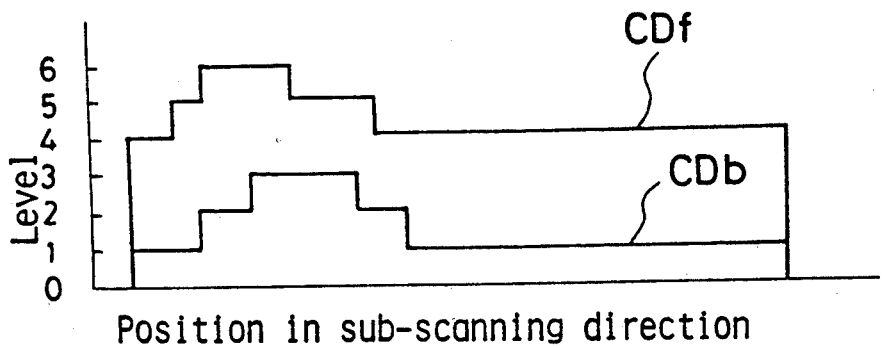
Figure 9C:
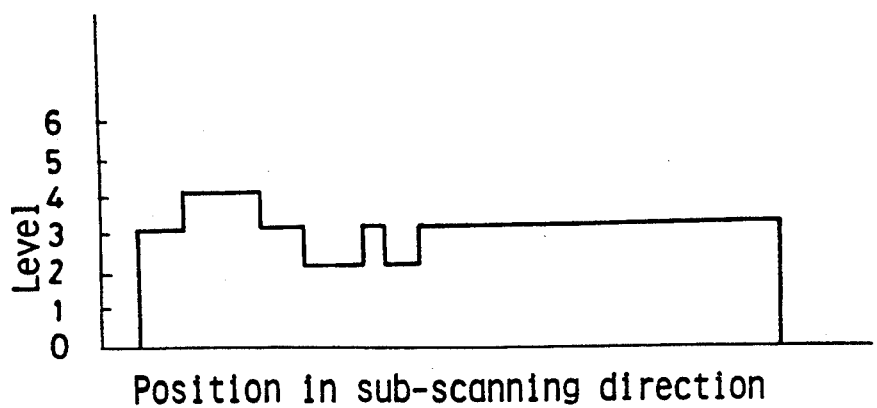

A mechanical configuration of an image reader in accordance with the present invention is identical with that of the prior art as shown in FIG. 7. Referring to FIG. 7, a manuscript 1, a white reference plate 6 and a black reference plate 7 are fixed on a paper holder 1A. A carriage 5 in which a light source 2, a lens 3 and an image sensor 4 are mounted is suspended under the paper holder 1A and is moved in the direction of arrow A. In the movement of the carriage 5 causes the manuscript 1 such as photography, white reference board 6 or the black reference board 7 to be illuminated by the light source 2. The images thereof are detected by the image sensor 4 through the lens 3. The image sensor 4 is composed of a plurality of semiconductor charge coupled devices (CCD) which are arranged on one line, for example, which is arranged perpendicular to the paper surface and to a direction of motion of the manuscript in FIG. 7. The white reference plate 6 has a reflection coefficient in the neighborhood of 1, and the black reference plate 7 has a reflection coefficient in the neighborhood of zero.

Figure 1:
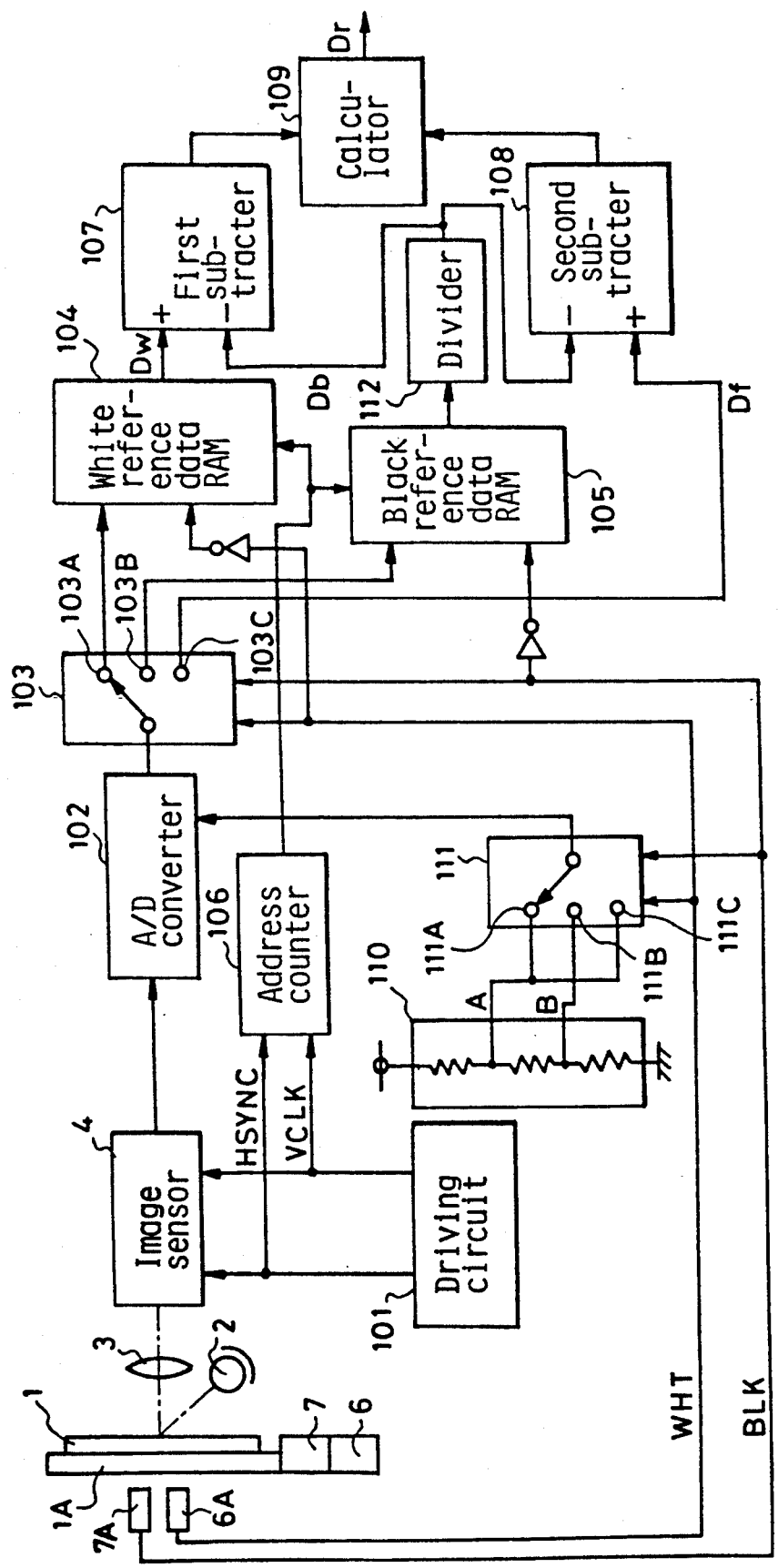
FIG. 1 is the circuit block diagram of a first embodiment of an image reader in accordance with the present invention.

FIG. 1 is a circuit block diagram of a first embodiment of the image reader in accordance with the present invention. Referring to FIG. 1, a driving circuit 101 supplies a scanning start signal HSYNC and a scanning clock signal VCLK to the image sensor 4. An image signal output from the image sensor 4 is applied to an A/D converter 102 of 8 bits, for example, and is converted into digital data. The digital data from the A/D converter 102 is applied to a data selector 103. The data selector 103 is activated by a white shading signal WHT which is generated by a position detecting means 6A of the white reference plate 6 and a black shading signal BLK which is generated by a position detecting means 7A of the black reference plate 7, and distributes the output digital data to a white reference data RAM 104, a black reference data RAM 105 and a subtracter 108.

The white reference data RAM 104 memorizes white reference data Dw which is image data of the white reference plate 6, and the black reference data RAM 105 memorizes the black reference data Db which is image data of the black reference plate 7. The output of the black reference data RAM 105 is applied to a divider 112 of 10 bits or more. An address counter 106 indicates write or read addresses of the white reference data RAM 104 and the black reference data RAM 105. The black reference data Db is subtracted from the white reference data Dw in a first subtracter 107, and the result is applied to a calculator 109.

The black reference data Db is subtracted from the image data Df of the manuscript 1 in a second subtracter 108, and a result is also applied to the calculator 109 of 8 bits. The calculator 109 converts the output data of the first and second subtracters 107 and 108 into 8 bits of digital data, and a corrected image data Dr of the manuscript 1 is calculated by the equation (1).

Operation of the image reader of the first embodiment is elucidated hereafter.

The charge coupled devices of the image sensor 4 is scanned in the sub-scanning direction of the manuscript 1 which is perpendicular to the paper surface in FIG. 7.

First, the image sensor 4 detects the white reference plate 6, and the image signal thereof is output in synchronism with the scanning start signal HSYNC and the scanning clock signal VCLK. The detected image signal is converted into digital image data by the A/D converter 102.

In the first embodiment, the A/D converter 102 of 8-bits converts a full-scale level "L" of an image signal which meets the image signal of the white reference plate 6 into digital image data of 255 steps. Subsequently, when the black reference signal of the black reference plate 7 is converted to digital image data, a full-scale level of the A/D converter 102 is changed to one-fourth (¼) of the level "L" by changing a reference voltage of the A/D converter 102, for example. The reference voltage is lowered by a voltage selector 111 which is activated by the white shading signal WHT and the black shading signal BLK. The voltage selector 111 is switched to a position 111A during A/D conversion of the image signal of the white reference plate 6, and is switched to a position 111B during A/D conversion of the image signal of the black reference plate 7. Furthermore, the voltage selector 111 is switched to a position 111C during A/D conversion of the image signal of the manuscript 1. The voltage at the position 111A is identical with that of the position 111C, and the voltage at the position 111B is a quarter of the voltage at the position 111A or 111C. Consequently, the black reference signal is substantially converted into digital image data by an A/D converter which is equivalent to a 10 bit A/D converter. Thus, the black reference signal is converted into high resolution digital data which is sampled with fine steps.

The output of the A/D converter 102 is applied to the data selector 103. In the data selector 103, when a white shading signal WHT which is generated by the position detecting means is applied, the data selector 103 is switched to a position 103A, and the image data from the A/D converter 102 is memorized in the white reference data RAM 104. In the foregoing process, white reference data Dw of one line of the image sensor 4 is memorized in compliance with the output of the address counter 106. The memorized white reference data Dw represents the maximum level of the image data.

Subsequently, the carriage 5 is shifted under the black reference plate 7, and the black shading signal BLK is output. Hence, the data selector 103 is switched to a position 103B, and in a similar manner, a black reference data Db of one line is memorized in the black reference data RAM 105. The black reference data Db represents a black level of the image data and is the minimum level the image data.

Then, the carriage 5 is shifted under of the manuscript 1, and reading process of the manuscript 1 is started. Since the white shading signal WHT and the black shading signal BLK are not output, the data selector 103 is switched to a position 103C, and the image data Df of one line of the manuscript 1 is applied to the second subtracter 108 through the data selector 103.

On the other hand, the black reference data Db in the black reference data RAM 105 is applied to the divider 112 of 10 bits or more, and is divided by 4. Then, the black reference data Db is subtracted from the image data Df of the manuscript 1: (Df−Db). And, in the first subtracter 107, the black reference data Db is subtracted from the white reference data Dw: (Dw−Db).

These data (Df−Db) and (Dw−Db) are applied to the calculator 109 of 8 bits, and the calculation shown in an equation (1) to be described later is accomplished. Consequently, a corrected image data Dr is output from the calculator 109.

$$Dr = 255 \times (Df - Db)/(Dw - Db) \quad (1)$$

In the equation (1), the number 255 represents the number of steps in A/D converting of 8 bits.

In the first embodiment, the full-scale level of the A/D converter is lowered in detection of the black reference plate 7, and thereby a quantization error in the digitized black reference data Db, in which a relatively low image signal is converted, is reduced.

In the first embodiment, diminution of the full-scale level in the A/D conversion of the black reference signal is not restricted to one-fourth of the original full-scale level L, but other value of the full-scale level can be selected. In this case, the black reference data Db in the black reference data RAM 105 is divided by a value which is related to the other value of the full-scale level.

Figure 2A:
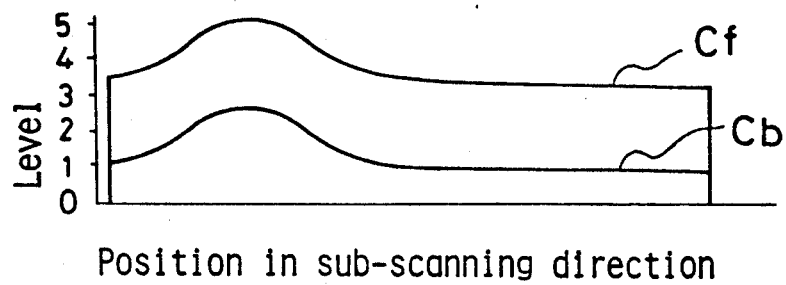
FIGS. 2(a), 2(b) and 2(c) are graphs showing operation of the first embodiment.

FIG. 2(a) is a graph of an input signal of the A/D converter 102.

Referring to FIG. 2(a), the ordinate designates an analog level of the image signal corresponding to the steps of 8-bit digital conversion, and the abscissa designates a position of the image sensor 4 along the subscanning direction. A curve Cb represents the image signal of the black reference plate 7, and a curve Cf represents an image signal of the darkest image on the manuscript 1. The convex variations of the levels of both the image signals of the black reference plate 7 and the manuscript 1 are attributed to inequality in the light distribution characteristic of the light source 2 or to inequality in a dark-current characteristic of the image sensor 4.

Figure 2B:
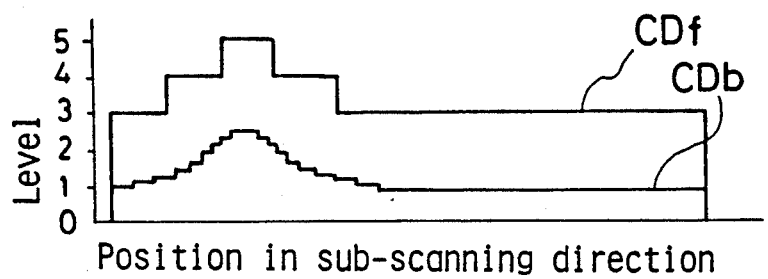
Figure 2C:
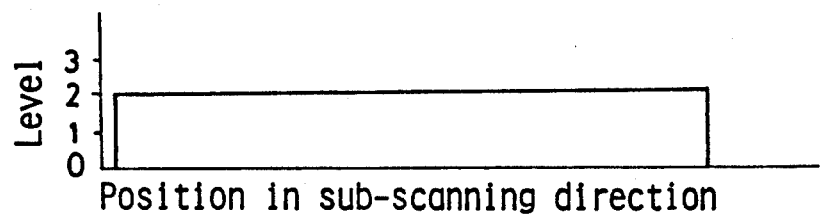

Referring to FIG. 2(b), a curve CDf represents the image data Df in which the image signal of the curve Cf is converted into digital data, and a curve CDb represents the black reference image data Db in which the image signal of the curve Cb is converted into digital data, and the digital data is divided by 4 in the divider 112. The abscissa designates a position of the black reference plate 7 along the sub-scanning direction. Referring to the equation (1), since the white reference data Dw is greatly larger than the black reference data Db, the denominator (Dw−Db) of the equation (1) is close to the white reference data Dw (e.g. Dw≈250, Db≈2). Therefore, the corrected image data Dr can be represented by only the numerator (Df−Db). Consequently, the corrected image data Dr is represented by a difference between the curves CDf and CDb shown in FIG. 2(c). In FIG. 2(b), since the difference (Df−Db) is in the range given by $$1.5 \leq (Df - Db) < 2.5 \qquad (2)$$

the corrected image data Dr becomes a constant level. Thus, distortion of gradation in image reproduction as shown in FIG. 2(a) is completely corrected.

Figure 3:
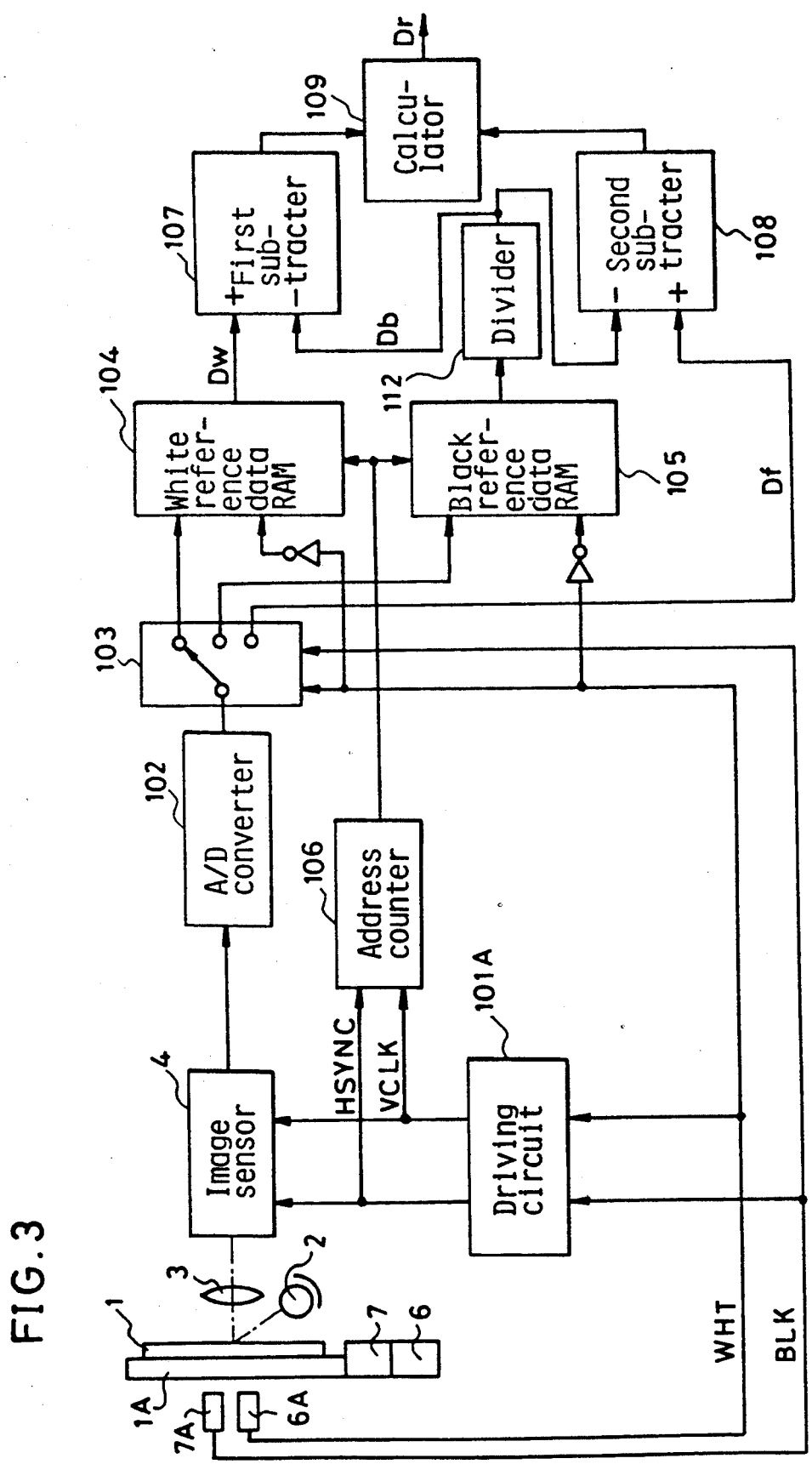
FIG. 3 is the circuit block diagram of a second embodiment of the image reader in accordance with the present invention.

FIG. 3 is a block diagram of a second embodiment of the image reader in accordance with the present invention.

Referring to FIG. 3, a driving circuit 101A is controlled by the white shading signal WHT and the black shading signal BLK, and when the image sensor 4 detects the black reference plate 7, the periodic times of the scanning starting signal HSYNC and the scanning clock signal VCLK are prolonged.

In the image sensor of the semiconductor CCD, the periodic time of the scanning starting signal HSYNC is a charging time of CCD, and the level of the detected image signal is in proportion to the charging time. In the second embodiment, the charging time in detection of the black reference plate 7 is prolonged to four times of that in detection of the white reference plate 6 or the manuscript 1 by prolonging the periodic times of the scanning starting signal HSYNC and the scanning clock signal VCLK. Hence, a voltage as high as four times of the output voltage is output from the image sensor 4 in detection of the black reference plate 7 and is applied to the A/D converter 102. Thus, the input level of the A/D converter 102 is enhanced, and adverse effect of a quantization error is reduced. The output of the A/D converter 102 is applied to the data selector 103, and in a similar manner to the first embodiment, the white reference data Dw is memorized in the white reference data RAM 104, the black reference data Db is memorized in the black reference data RAM 105, and the image data of the manuscript 1 is applied to the second subtracter 108. The operation after the above-mentioned steps is substantially identical with that of the first embodiment.

Figure 4:
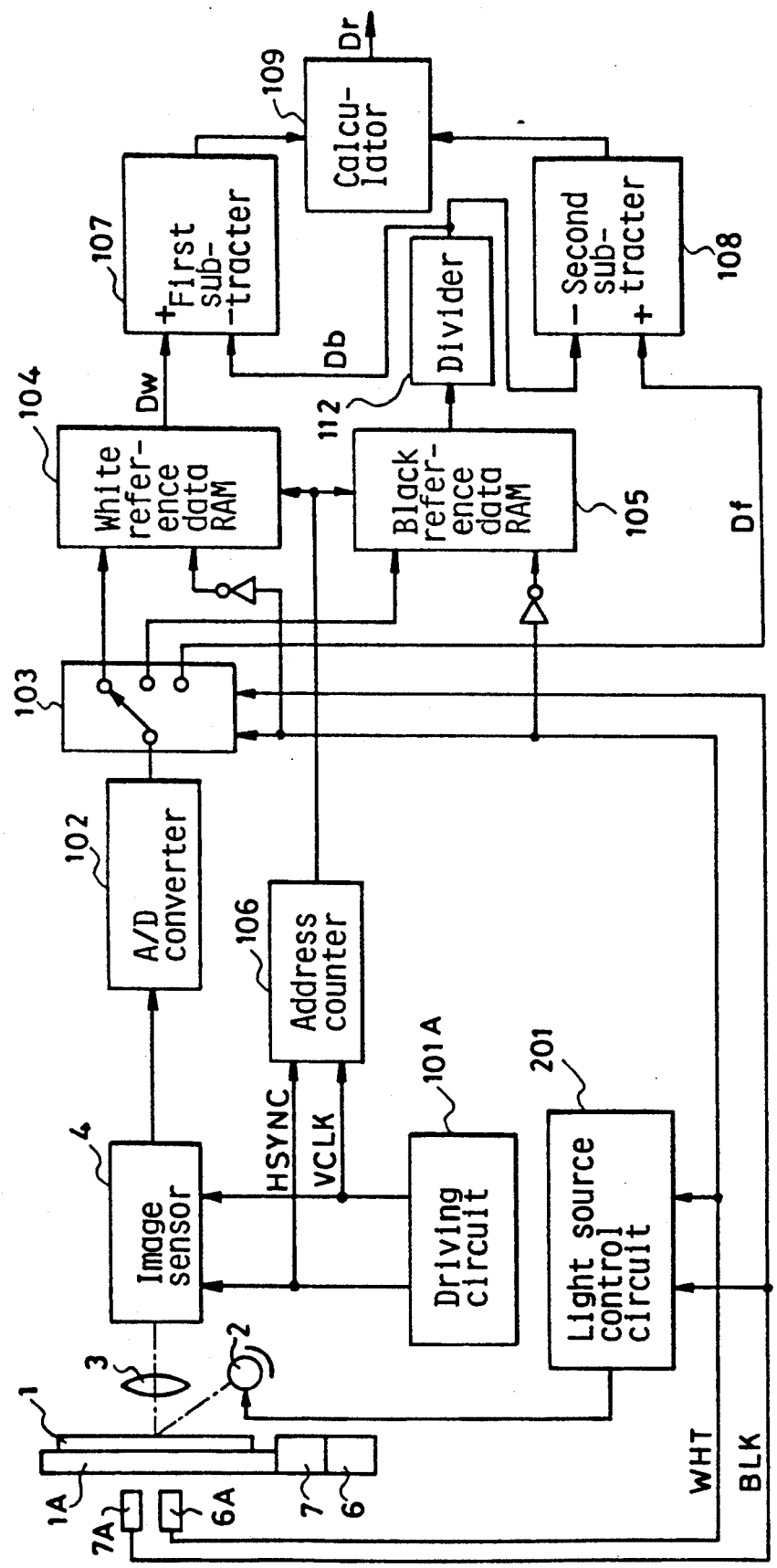
FIG. 4 is the circuit block diagram of a third embodiment of the image-reader in accordance with the present invention.

FIG. 4 is a block diagram of a third embodiment of the image reader in accordance with the present invention. In the third embodiment, a light source control circuit 201 for controlling the light intensity of the light source 2 is provided. The light source control circuit 201 is activated by the white shading signal WHT and the black shading signal BLK, and the light intensity is enhanced in detection of the black reference plate 7. In the embodiment, the light intensity in detection of the black reference plate 7 is made to be as large as 4 times of the light intensity in detection of the white reference plate 6 or the manuscript 1. Consequently, the image signal level on the black reference plate 7 is relatively 4 times of the image signal levels of the white reference plate 6 or the manuscript 1. Thus, the input level of the A/D converter 102 is enhanced, and adverse effect of a quantization error is reduced. The output of the A/D converter 102 is applied to the data selector 103, and in a similar manner to the first embodiment, the white reference data Dw is memorized in the white reference data RAM 104, the black reference data Db is memorized in the black reference data RAM 105, and the image data of the manuscript 1 is applied to the second subtracter 108. The process after the above-mentioned steps is substantially identical with that of the first embodiment.

Figure 5:
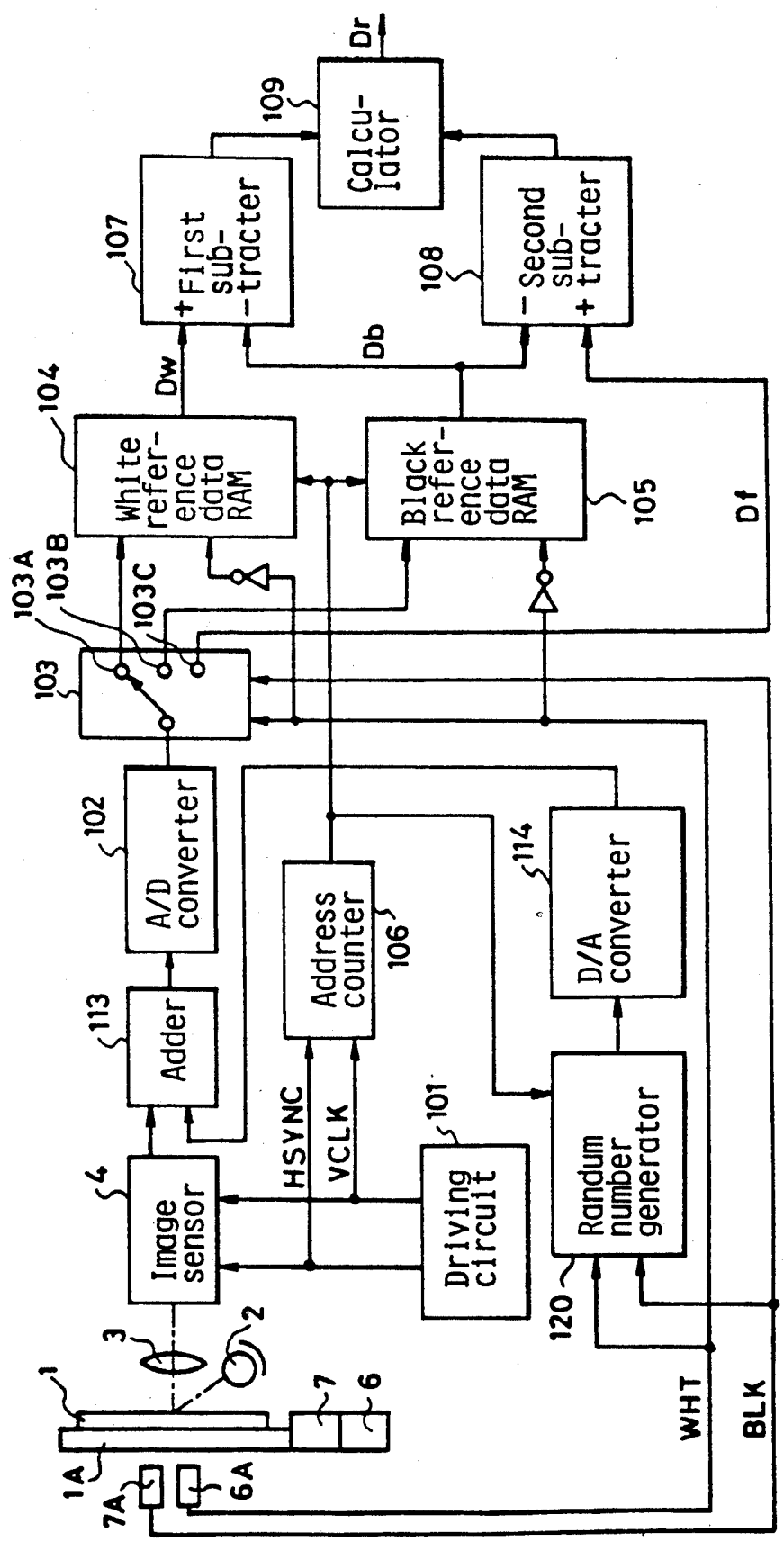
FIG. 5 is the circuit block diagram of a fourth embodiment of the image reader in accordance with the present invention.

FIG. 5 is a block diagram of a fourth embodiment of the image reader in accordance with the present invention. In a similar manner to the first embodiment, the image of the white reference plate 6, the black reference plate 7 or the manuscript 1 is detected by the image sensor 4. The output image signal of the image sensor 4 is applied to an adder 113 for adding a random analogue signal to the image signal. The output of the adder 113 is applied to the A/D converter 102 of 8-bits. The output of the A/D converter 102 is allocated to the white reference data RAM 104, the black reference data RAM 105 or the second subtracter 108 by the data selector 103.

The black reference data of the black reference data RAM 105 is applied to the first and second subtracters 107 and 108, and calculation of the equation (1) is accomplished in like manner to the first embodiment.

The image reader of the fourth embodiment is provided with a random number generator 120 which generates signals representing number "+1", "0" or "−1", for example, in random order and in synchronism with the output signal of the address counter 106.

Figure 6:
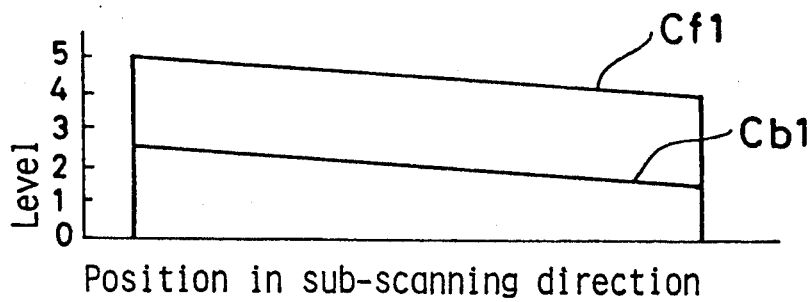
FIGS. 6(a), 6(b), 6(c), 6(d) and 6(e) are graphs showing operation of the fourth embodiment.
Figure 6:
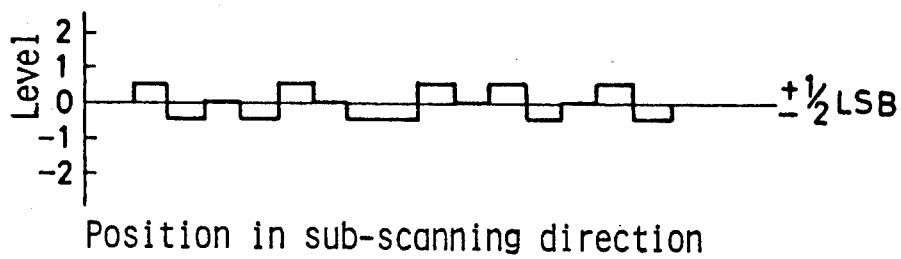
Figure 6:
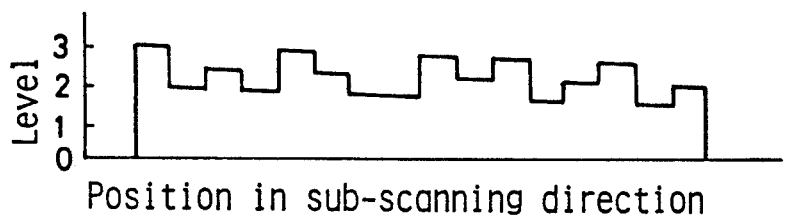
Figure 6:
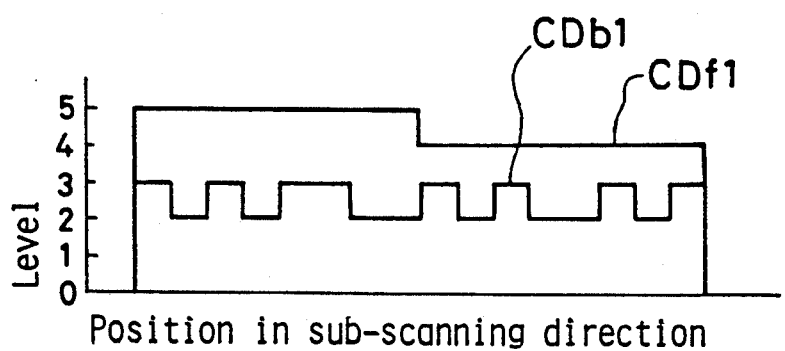
Figure 6:
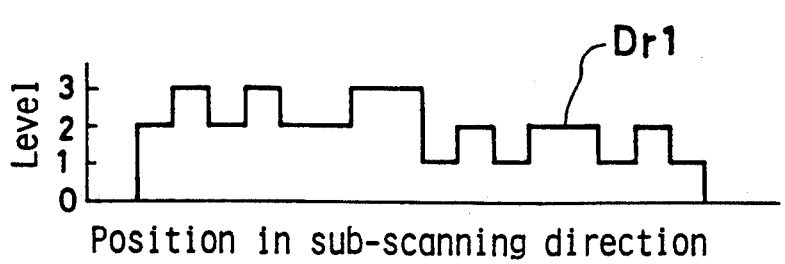

The random number is converted into a random analogue signal as shown in FIG. 6(b) by the D/A converter 114 and is applied to the adder 113. In the D/A conversion, the peak-to-peak level of the analogue signal is selected to the value of the least significant bit (LSB), for example.

The random analogue signal is superimposed on the image signal in the adder 113, and is converted into digital data by the A/D converter 102.

Operation of the embodiment will be explained with reference to FIGS. 6(a)−6(g).

FIG. 6(a) is a graph of image signals output from the image sensor 4. Referring to FIG. 6(a), a curve Cf1 represents an image signal of the manuscript 1, and a curve Cb1 represents a black reference signal which is the image signal of the black reference plate 7. The random analogue signal shown in FIG. 6(b) is superimposed on the black reference signal shown by the curve Cb1 in the adder 113. The output signal of the adder 113 is shown in FIG. 6(c). The output signal of the adder 113 is converted into digital data by the A/D converter 102. The output digital data of the A/D converter 102 is shown in FIG. 6(d). Referring to FIG. 6(d), a curve CDb1 represents the black reference data Db1 of the black reference plate 7, and a curve CDf1 represents the image data Df1 of the manuscript 1.

The black reference data Db1 is subtracted from the image data Df1 of the manuscript 1 in the second subtracter 108, and is applied to the calculator 109. Hence, the corrected image data Dr1 shown in FIG. 6(e) is output.

In the fourth embodiment, as shown in FIG. 6(e), the corrected image data Dr1 is irregularly distributed to a value 2 or 3 of the digital data. Therefore, variation in density on the reproduced copy paper is irregular and inconspicuous.

For instant, in FIG. 6(a), if the random analogue signal is not superimposed on the image signal shown by the curve Cb1, as shown in FIG. 10(a), a step-shaped variation 117 of level is created in a curve CDb2 showing the black reference data converted by the A/D converter 102. Since the step-shaped variation 117 is in the corrected image data Dr2 as shown in FIG. 10(b), two zones which are different from each other in density are distinctly distinguished by a conspicuous border which is perpendicular to the sub-scanning direction are reproduced on a copy paper. According to the fourth embodiment, the above-mentioned problem is prevented.

In the respective embodiments, the calculator 109 is composed preferably of a "look-up table" using PROM in which previously calculated data are memorized in a manner that will be familiar to one skilled in the art.

Although the invention has been described in its preferred form with a certain degree of particularity, it is understood that the present disclosure of the preferred form has been changed in the details of construction and the combination and arrangement of parts may be resorted to without departing from the spirit and the scope of the invention as hereinafter claimed.

What is claimed is:

1. An image reader for reading a manuscript arranged on a manuscript plane, comprising:
   a black reference object having a minimum reflection coefficient also arranged on said manuscript plane,
   an image sensor for issuing image signals of multi-gradation images of an object on said manuscript plane,
   an A/D converter for converting said image signals detected by said image sensor into digital data based on a reference voltage wherein a range of said converting depends on a value of said reference voltage,
   a voltage selector means for supplying said reference voltage to said A/D converter, supplying a first reference voltage for detecting said black reference object to said A/D converter, which is lower than a second reference voltage supplied for detecting said manuscript so that said black reference object is A/D converted with a higher dynamic range,
   a dividing means for dividing said digital data of the black reference object from said A/D converter to another digital data,
   a subtracter for subtracting the another digital data of said black reference object from the digital data of the manuscript to obtain a difference therebetween, and issuing digital data indicative of said difference, and
   a calculator for converting the digital data of said difference into digital data having a same number of bits as said A/D converter.

2. An image reader for reading a manuscript arranged on a manuscript plane, comprising:
   a black reference object having a minimum reflection coefficient also arranged on said manuscript plane,
   an image sensor for issuing image signals of multi-gradation images of an object on said manuscript plane,
   an A/D converter for converting said image signal into digital data on the basis of a reference level wherein a range of said converting depends on a value of said reference voltage,
   voltage selector means for supplying a first reference level to said A/D converter for detecting said black reference object on said manuscript plane and supplying a second reference level to said A/D converter for detecting said manuscript on said manuscript plane, said first reference voltage being lower than said second reference voltage so that said black reference object is A/D converted with a higher dynamic range,
   a dividing means for dividing a value of said digital data of the black reference object to form divided digital data,
   a subtracter for subtracting the divided digital data of said black reference object from the digital data of the manuscript to obtain a difference therebetween, and issuing digital data indicative of said difference, and
   a calculator for converting the digital data of said difference into digital data of the same number of bits as said A/D converter.

3. An image reader for reading a manuscript arranged on a manuscript plane, comprising:
   a black reference object having a minimum reflection coefficient also arranged on said manuscript plane,
   an image sensor including a semiconductor charge coupled device for issuing image signals of multi-gradation images of said manuscript, and for issuing enhanced image signals of said black reference object by prolonging respective periodic times of a scanning starting signal and a scanning clock signal,
   an A/D converter for converting said image signal from said image sensor into digital data based on a reference voltage wherein a range of said converting depends on a value of said reference voltage,
   a voltage selector means for supplying a first reference voltage for detecting said black reference object being lower than a second reference voltage for detecting said manuscript to said A/D converter so that said black reference object is A/D converted with a higher dynamic range,
   a dividing means for dividing said digital data of the black reference object to a divided value,
   a subtracter for subtracting the divided digital data of said black reference object from the digital data of the manuscript to obtain a difference therebetween, and issuing digital data indicative of said difference, and
   a calculator for converting the digital data of the difference into digital data of the same number of bits as said A/D converter.

4. An image reader for reading a manuscript arranged on a manuscript plane, comprising:
   a black reference object having a reflection coefficient of substantially zero also arranged on said manuscript plane,
   a light source for radiating enhanced light in illumination of said black reference object,
   an image sensor for detecting a multi-gradation image of an object on said manuscript plane,
   an A/D converter for converting said detected signal of said image sensor into digital data based on a reference voltage, wherein a range of said converting depends on a value of said reference voltage, a voltage selector means for supplying a first reference voltage to said A/D converter for detecting said black reference object, which is lower than a second reference voltage which is supplied to said A/D converter for detecting said manuscript, a dividing means for dividing said enhanced value of the digital data of the black reference object to a divided value, a subtracter for subtracting the divided digital data of said black reference object from the digital data of the manuscript to obtain a difference therebetween, and issuing digital data indicative of said difference, and a calculator for converting the digital data of said difference into digital data of the same number of bits as said A/D converter.

* * * * *